US006954863B2

(12) United States Patent
Mouton

(10) Patent No.: US 6,954,863 B2
(45) Date of Patent: Oct. 11, 2005

(54) LOCAL AREA NETWORK TERMINAL ADAPTED TO BE REBOOTED WITH LOCAL POWER SUPPLY INTERRUPTION IF REMOTE POWER SUPPLY IS NOT BEING RECEIVED

(75) Inventor: Michel Mouton, Strasbourg (FR)

(73) Assignee: Alcatel, Paris (FR)

( * ) Notice: Subject to any disclaimer, the term of this patent is extended or adjusted under 35 U.S.C. 154(b) by 636 days.

(21) Appl. No.: 09/879,046

(22) Filed: Jun. 13, 2001

(65) Prior Publication Data

US 2002/0002672 A1 Jan. 3, 2002

(30) Foreign Application Priority Data

Jun. 19, 2000 (FR) .......................................... 00 07790

(51) Int. Cl.[7] ................................................ G06F 1/30
(52) U.S. Cl. ........................ 713/300; 713/310; 713/324
(58) Field of Search ............................... 713/300, 310, 713/324

(56) References Cited

U.S. PATENT DOCUMENTS

| 4,545,013 | A | * | 10/1985 | Lyon et al. ................ 714/712 |
| 5,331,209 | A | * | 7/1994 | Fujisawa et al. ........... 327/545 |
| 5,379,341 | A | * | 1/1995 | Wan ...................... 379/102.04 |
| 5,410,706 | A | * | 4/1995 | Farrand et al. ............... 713/2 |
| 5,640,504 | A | * | 6/1997 | Johnson, Jr. ................... 714/4 |
| 5,732,212 | A | * | 3/1998 | Perholtz et al. ............. 709/224 |
| 5,742,514 | A |   | 4/1998 | Bonola |
| 5,784,684 | A | * | 7/1998 | Van Wageningen et al. .... 455/9 |
| 5,835,719 | A |   | 11/1998 | Gibson et al. |
| 5,870,613 | A | * | 2/1999 | White et al. ................ 713/300 |
| 5,871,368 | A | * | 2/1999 | Erdner et al. ............... 439/188 |
| 5,991,885 | A | * | 11/1999 | Chang et al. ............... 713/300 |
| 6,252,881 | B1 | * | 6/2001 | Samoylenko ............... 370/433 |
| 6,298,378 | B1 | * | 10/2001 | Angal et al. ................ 709/223 |
| 6,348,874 | B1 | * | 2/2002 | Cole et al. ............. 340/825.01 |
| 6,430,687 | B1 | * | 8/2002 | Aguilar et al. ................ 713/2 |
| 6,473,608 | B1 | * | 10/2002 | Lehr et al. ................. 455/402 |
| 6,721,319 | B1 | * | 4/2004 | Amano et al. .............. 370/390 |

FOREIGN PATENT DOCUMENTS

EP          0 981 227 A2    2/2000

* cited by examiner

Primary Examiner—Lynne H. Browne
Assistant Examiner—Tse Chen
(74) Attorney, Agent, or Firm—Sughrue Mion, PLLC

(57) ABSTRACT

A method of rebooting terminals connected to a local area network capable of providing a remote power supply to the terminals from at least one remote power supply unit, in particular terminals receiving a local power supply and which can receive a remote power supply in the event of failure of their local power supply, commands rebooting of the terminals by means of a command signal consisting of interruption of a remote power supply provided to the terminals by a remote power supply unit.

2 Claims, 3 Drawing Sheets

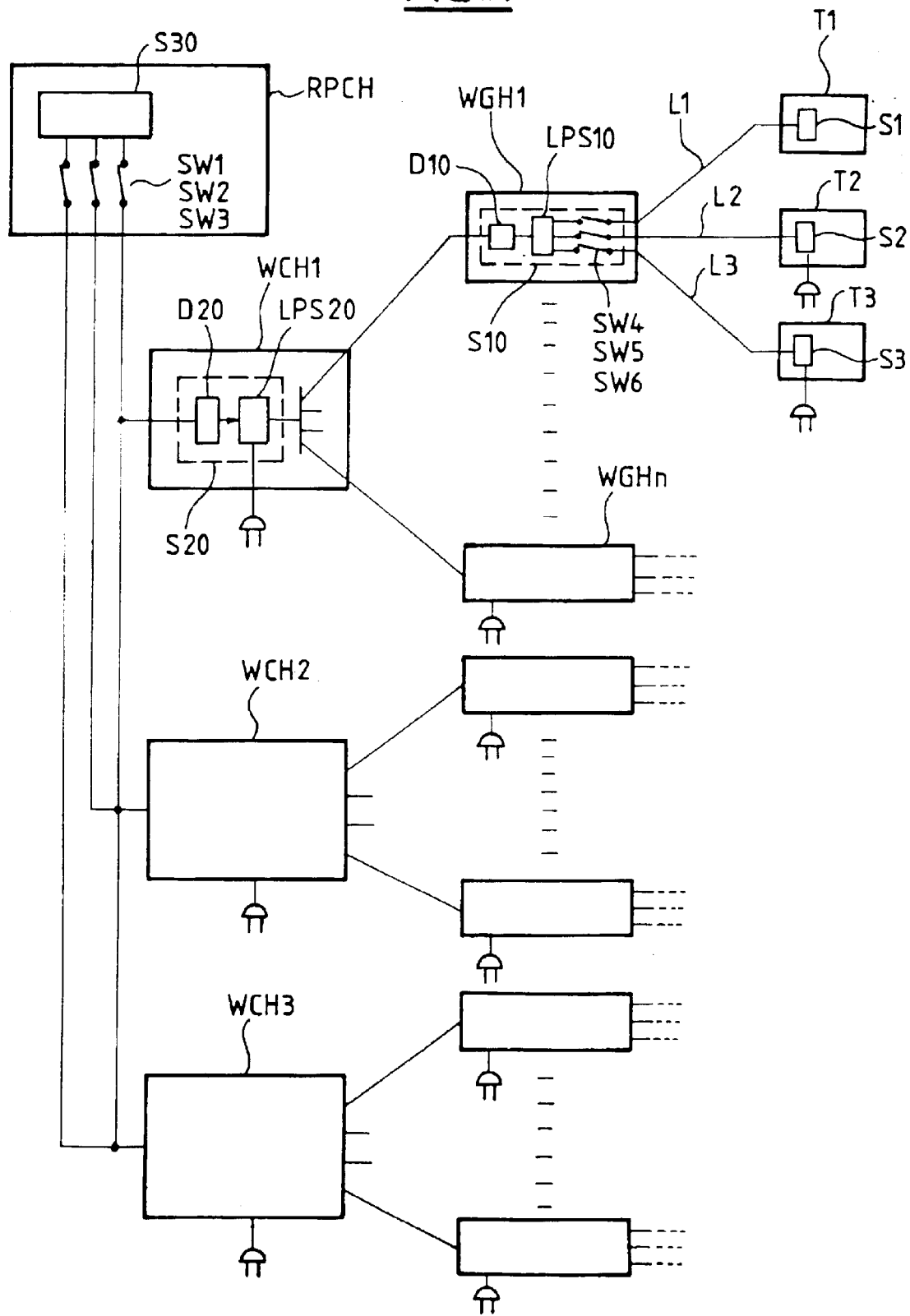
FIG_1

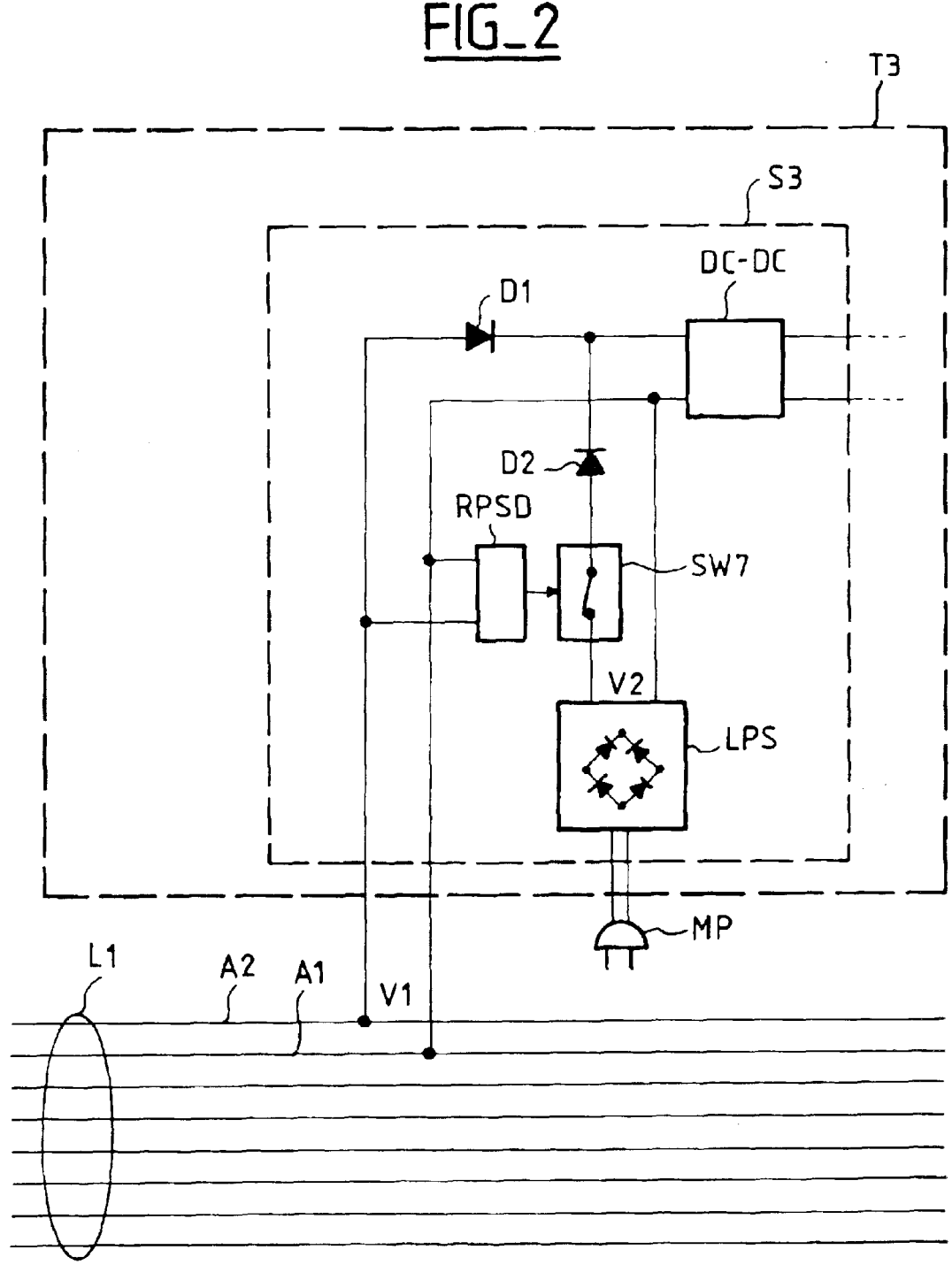
FIG_2

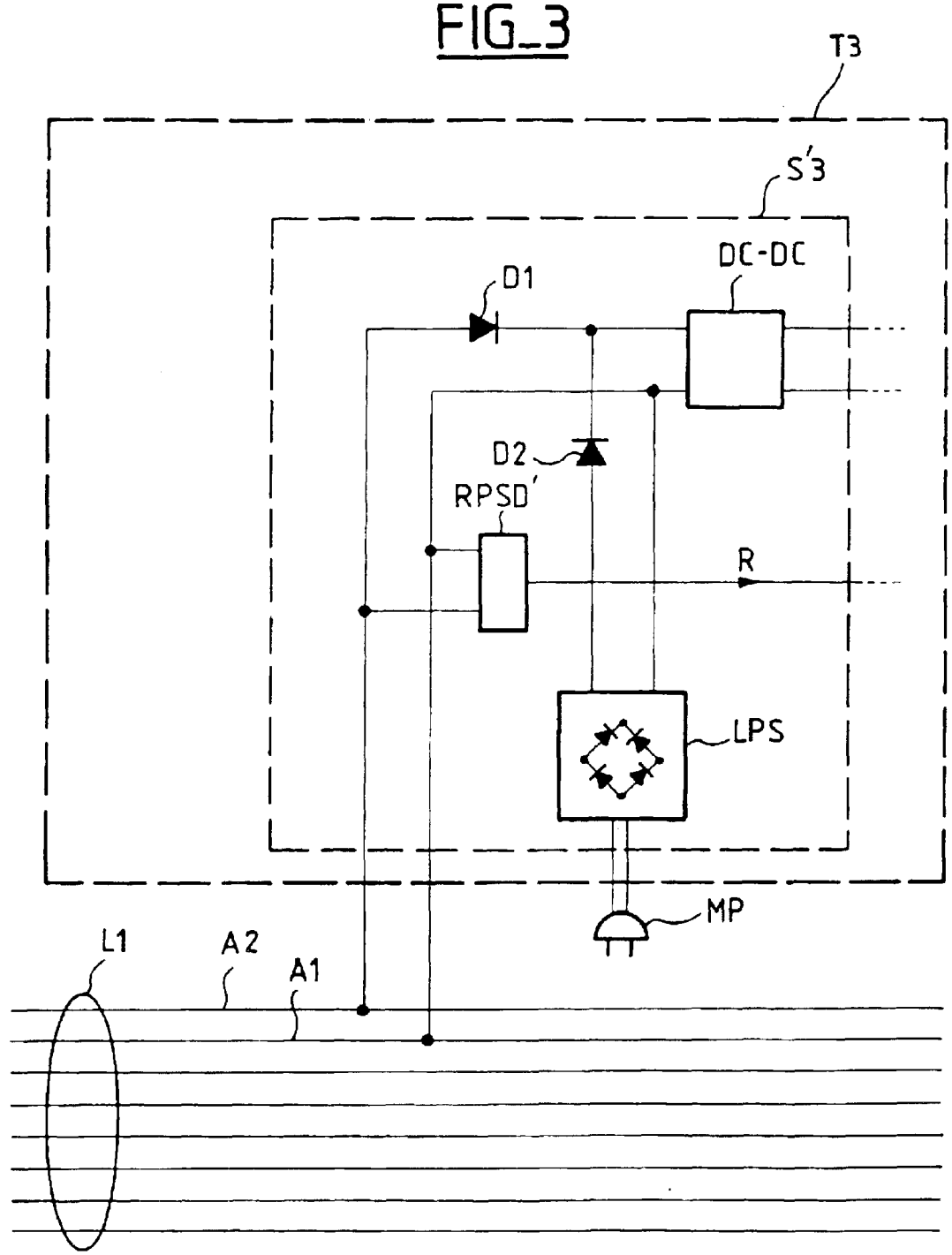

LOCAL AREA NETWORK TERMINAL ADAPTED TO BE REBOOTED WITH LOCAL POWER SUPPLY INTERRUPTION IF REMOTE POWER SUPPLY IS NOT BEING RECEIVED

CROSS-REFERENCE TO RELATED APPLICATIONS

This application is based on French Patent Application No. 00 07 790 filed Jun. 19, 2000, the disclosure of which is hereby incorporated by reference thereto in its entirety, and the priority of which is hereby claimed under 35 U.S.C. §119.

BACKGROUND OF THE INVENTION

1. Field of the Invention

The invention concerns a method of rebooting terminals connected to a local area network and devices (concentrators and terminals) for implementing the method. If relates more particularly to local area networks which provide a remote power supply to the terminals, especially Ethernet local area networks capable of providing a remote power supply to the terminals.

2. Description of the Prior Art

Many different types of terminal can be connected to this kind of network (for example telephones which use the Internet protocol). It is sometimes necessary to reboot some terminals so that they restart with a new configuration, for example after a network administrator has commanded the downloading of software. It is often the case that the only way to reboot a terminal is to switch it off manually and then to switch it on again. Processors and logic circuits include a device that reboots them automatically when the supply voltage increases from zero to its nominal value.

It is sometimes necessary to switch off some of the terminals or all of the terminals for network maintenance operations. Usually someone goes to each terminal to switch it off, or asks each user to switch off their terminal. This operation is time-consuming if there are many terminals to be switched off. It is also desirable to be able to reboot the concentrators.

A device for rebooting terminals, connected to a local area network, by broadcasts over the network data packets commanding interruption of the local power supply in each terminal and possibly in the concentrators is known in the art. This device has the drawback that it is inoperative if executing software has caused the terminal to crash (for example because of accidental loopback).

The object of the invention is to propose a method and simpler devices for rebooting many terminals and concentrators from a central point that are not subject to this problem.

SUMMARY OF THE INVENTION

The invention provides a method of rebooting terminals connected to a local area network capable of providing a remote power supply to the terminals from at least one remote power supply unit, which method commands rebooting of the terminals by means of a command signal consisting of interruption of a remote power supply provided to the terminals by a remote power supply unit.

The above method does not transmit data over the network, but transmits signaling completely independent of the data, via the remote power supply unit, and can therefore command a reboot even if executing software has caused the processor of the terminal to crash.

The invention also provides a concentrator for a local area network, which concentrator is capable of rebooting terminals connected to the local area network and includes a remote power supply unit for providing a remote power supply to concentrators and/or terminals on its downstream side and is adapted to command interruption of the remote power supply of terminals and/or concentrators on its downstream side.

The invention further provides a terminal adapted to be connected to a local area network which is adapted to provide a remote power supply to a terminal in the event of failure of its local power supply, the terminal including a local power supply unit, a coupler for coupling it to the local area network, and a detector for detecting that the terminal is no longer receiving any remote power supply provided by the network, and being adapted to reboot the terminal if the detector detects that the terminal is no longer receiving any remote power supply provided by the network.

The invention will be better understood and other features will become apparent from the following description and the accompanying drawings.

BRIEF DESCRIPTION OF THE DRAWINGS

FIG. 1 is a block diagram of one example of a local area network with remote power supply and including concentrators and terminals in accordance with the invention.

FIG. 2 is a block diagram of one embodiment of a terminal according to the invention.

FIG. 3 is a block diagram of a different embodiment of a terminal according to the invention.

DETAILED DESCRIPTION OF THE PREFERRED EMBODIMENTS

The local area network shown by way of example in FIG. 1 is an Ethernet network and includes:
  a remote power supply control main concentrator RPCH which is connected to an Ethernet switch (not shown) and which can reboot all or part of the network,
  three distributor cabinet concentrators WCH1, WCH2, WCH3 which serve three respective floors of a building, for example, and which are connected to three respective ports of the concentrator RPCH, and
  working group concentrators WGH1, etc. connected to respective ports of the three distributor cabinet concentrators WCH1, WCH2, WCH3.

For example, n working group concentrators WGH1 to WGHn are respectively connected to n ports of the distributor cabinet concentrator WCH1. Each working group concentrator WGH1 to WGHn has several ports. Each of these ports is connected to a single terminal. For example, three lines L1, L2, L3 are connected to three respective ports of the concentrator WGH1. Some of the terminals, such as the terminal T1, are terminals which are powered exclusively by a remote power supply. Other terminals, such as the terminal T2, are powered locally by the AC mains and do not use the remote power supply. Finally, further terminals, such as the terminal T3, are powered locally but can also receive a remote power supply via the network, at least for essential functions, in the event of a power outage on the AC mains. According to the invention, the latter each include a power supply unit, such as the device S3 in the terminal T3, enabling them to be rebooted remotely.

In FIG. 1, the concentrators and terminals that can be powered locally are represented with a mains power plug.

Each terminal is connected by an RJ45 connector to a line made up of eight conductors. Various remote power supply methods are available. A standard (IEEE 802.3af) is currently being drawn up for Ethernet networks. One way to transmit a remote power supply current is to use two of the eight wires of the line: four other wires constitute two pairs respectively used to send and receive data. Another method, called a phantom circuit, consists of connecting the two terminals of a power supply generator in the remote power supply unit to respective mid-points of a winding of a transformer connected to the data receiving pair and a winding of another transformer connected to the data sending pair. At the terminal end, the supply voltage is provided by the respective mid-points of a winding of a transformer connected to the data receiving pair and a winding of another transformer connected to the data sending pair.

The remote power supply is supplied to the lines L1, L2, L3 by a remote power supply unit S10 in the concentrator WGH1. The device S10 has a local power supply unit LPS10 which is supplied with energy by the AC mains and a remote power supply detector D10 connected to the line that connects the concentrator WGH1 to the concentrator WCH1. The detector D10 is connected to a control input of the local power supply unit LPS10 to command interruption of the remote power supply provided by the remote power supply unit S10 on its downstream side if the concentrator WGH1 is no longer receiving the remote power supply from the concentrator WCH1 on its upstream side.

Manual switches SW4, SW5, SW6, etc. can also be provided in each working group concentrator WGH1 to WGHn to interrupt the respective remote power supply on the lines L1, L2, L3, etc. connected to that concentrator for remote rebooting of a subset of the network, which can be as small as one terminal.

The three distributor cabinet concentrators WCH1, WCH2, WCH3 also provide a remote power supply at their ports. That remote power supply can power any terminals connected directly to these ports, but is used primarily to control the remote power supply units like the device S10 in the n working group concentrators WGH1 to WGHn. For example, if the remote power supply unit S20 of the concentrator WCH1 is no longer providing a remote power supply to the n working group concentrators WGH1 to WGHn, the remote power supply units incorporated therein, in particular the device S10, cease to provide a remote power supply to the terminals T1, T2, T3, etc. The terminals that receive a remote power supply, such as the terminal T1, are therefore rebooted.

The remote power supply supplied to the concentrators WGH1 to WGHn is produced by a remote power supply unit S20 in the concentrator WCH1, for example. The device S20 has a local power supply unit LPS20 supplied with energy from the AC mains and a remote power supply detector D20 which is connected to the line that connects the concentrator WCH1 to the concentrator RPCH. The detector D20 is connected to a control input of the local power supply unit LPS20 to command interruption of the remote power supply provided on its downstream side by the remote power supply unit S20 if the concentrator WCH1 is no longer receiving the remote power supply provided by the concentrator RPCH on its upstream side.

In terminals in accordance with the invention powered locally but with a back-up remote power supply facility, like the terminal T3, the power supply unit like the device S3 in the terminal T3 detects the disappearance of the remote power supply and this triggers rebooting of the terminal.

In each of the terminals that receives only the remote power supply, such as the terminal T1, interruption of the remote power supply causes rebooting when the remote power supply is re-established.

In each of the terminals which is powered locally, and independently of the remote power supply, such as the terminal T2, the power supply unit such as the device S2 continues to power the terminal and the terminal is therefore not rebooted. This applies to personal computers, for example.

The remote power supply control concentrator RPCH includes a remote power supply unit S30 which also provides a remote power supply at its ports. That remote power supply could also power any terminals connected directly to these ports, but it is used primarily to control the remote power supply units, such as the device S20, in the three distributor concentrators WCH1, WCH2, WCH3. The concentrator RPCH includes three switches SW1, SW2, SW3 enabling an administrator selectively to command interruption of the remote power supply to the downstream terminals and/or concentrators at the three ports. These switches can be manually operated mechanical switches or electronic switches operated by an electrical reboot command signal produced by an electronic console.

The disappearance of the remote power supply received by a remote power supply unit such as the device S20 in the three distributor concentrators WCH1, WCH2, WCH3 cuts off the remote power supply provided by those concentrators and, by a knock-on effect, cuts off the remote power supply provided by the working group concentrators WGH1 to WGHn. It is therefore possible to reboot all the terminals of a stage at a stroke, or all the terminals of the network, except for terminals powered locally independently of the remote power supply, such as the terminal T2.

In other embodiments, the main concentrator RPCH can be integrated into the Ethernet switch.

FIG. 2 is a block diagram of one embodiment of a terminal according to the invention. The terminal T3 includes a power supply unit S3 which includes a DC-DC converter having two input terminals. The DC-DC converter is usually powered from the AC mains reaching it at an AC mains connector MP, employing a conventional rectifier circuit LPS supplying a filtered DC voltage V2. In the event of an AC mains power outage, It is powered from a voltage V1 supplied by the remote power supply by means of two conductors A1, A2 of the line L. The line L includes six other conductors, which are used in particular to send and receive data.

The rectifier circuit LPS has two output terminals, one of which is connected to a first terminal of the DC-DC converter and the other of which is connected to a second terminal of the DC-DC converter via a switch SW7 and a diode D2. The conductor A1 is connected directly to the first terminal of the DC-DC converter and the conductor A2 is connected to the second terminal of the DC-DC converter via a switch SW7 and a diode D2. The cathodes of the two diodes D1 and D2 are both connected to the second terminal of the DC-DC converter. A remote power supply detector RPSD has two terminals connected to the conductors A1 and A2. It closes the switch SW7 when the remote power supply is supplied via the network and opens it when the remote power supply is not provided by the network, i.e. if a reboot is commanded.

When the remote power supply is provided and the AC mains supply is present, the diode D2 conducts and the diode D1 is cut off, because the remote power supply voltage V1 is less than the voltage V2 supplied by the rectifier LPS. The terminal is then powered locally. This is advantageous for terminals with a high power consumption, which cannot be powered exclusively by a remote power supply because of limitations imposed by the characteristics of the line L.

In the event of an AC mains power outage (or of failure of the rectifier LPS), the diode D1 conducts. At least the essential functions of the terminal T3 are then backed up by the remote power supply.

If the remote power supply is interrupted, by the switch SW1 in the concentrator RPCH, for example, the detector RPSD opens the switch SW7 and thereby prevents the transmission of power from the rectifier LPS to the DC-DC converter. The terminal T3 is therefore rebooted when the remote power supply is re-established.

FIG. 3 is a block diagram of a different embodiment of a terminal according to the invention. This embodiment does not include the switch SW7. The detector RPSD is replaced by a detector RPSD' which does not supply a control signal for a switch but instead applies a logic signal R to a reset input of a processor (not shown). The terminal can therefore be rebooted without interrupting its power supply.

The method according to the invention is independent of the type of data transmission and of the type of remote power supply used in the network. The skilled person knows how to adapt the embodiment described above if the remote power supply is transmitted via the network by some other method or if each terminal has its own line for connecting it to a concentrator (for example to implement a method of automatically recognizing the terminal type).

There is claimed:

1. A terminal adapted to be connected to a local area network which is adapted to provide a remote supply of power to said terminal in the event of a failure of a local supply of power to said terminal, said terminal comprising:

a local power supply unit (S3) which provides said local supply of power to said terminal;

a coupler (D1) for coupling said terminal to said local area network; and a detector (RDSD; RPSD') for detecting whether or not said terminal is receiving any remote supply of power provided by said network, wherein said terminal is rebooted if said detector detects that said terminal is no longer receiving any remote supply of power provided by said network, and wherein said local supply of power provided by said local power supply unit is interrupted to reboot said terminal if said detector detects that said terminal is no longer receiving any remote supply of power provided by said network.

2. The terminal claimed in claim 1 adapted to produce a logic signal to reboot said terminal if said detector detects that said terminal is no longer receiving any remote supply of power provided by said network.

* * * * *